V. C. DE YBARRONDO.
REMOVABLE NAIL.
APPLICATION FILED MAR. 17, 1908.
975,310.
Patented Nov. 8, 1910.
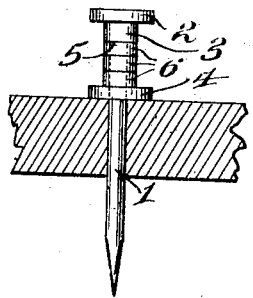
Witnesses
Hugh H. Ott
C. C. Hinds.
Inventor
Vincent C. de Ybarrondo
By Victor J. Evans
Attorney

UNITED STATES PATENT OFFICE.

VINCENT C. DE YBARRONDO, OF LOS ANGELES, CALIFORNIA.

REMOVABLE NAIL.

975,310.  Specification of Letters Patent.  Patented Nov. 8, 1910.

Application filed March 17, 1908. Serial No. 421,728.

*To all whom it may concern:*

Be it known that I, VINCENT C. DE YBARRONDO, a citizen of the United States, residing at Los Angeles, in the county of Los Angeles and State of California, have invented new and useful Improvements in Removable Nails, of which the following is a specification.

This invention relates to improvements in removable nails, the object of the invention being to provide a novel construction of nail by which the parts of temporary or take-apart articles may be detachably united, the construction being such that the head of the nail will be exposed, allowing it to be readily and conveniently withdrawn by the use of an ordinary hammer claw when occasion requires.

The invention consists of the features of construction, combination and arrangement of parts hereinafter fully described and claimed, reference being had to the accompanying drawing, in which the single view given is a side elevation showing the use of the spacing washers hereinafter referred to.

Referring now more particularly to the drawing, the numeral 1 designates the shank of the nail and 2 its head, which parts may be of any preferred form. Formed integrally with the shank and head at their point of junction is a collar 3, of greater diameter than the shank and of less diameter than the head so as to leave a flat shoulder 5 facing downward away from the head. Designed for use in connection with the nail is a washer 4, which may be of ordinary construction but preferably has flat faces, its opening however being of a prescribed diameter to snugly fit the shank 1, so that the washer will retain its position by friction on the shank, but may be forcibly adjusted or detached by a sliding movement.

In the practical use of the nail, the washer is applied in position and the nail driven into the part to be secured by blows upon the head 2 from a hammer or other tool. The washer bears against the outer surface of one of the parts, and, when the nail is fully driven in, the shoulder 5 at the lower end of the collar 3 abuts against said washer, thus preventing the nail from being farther driven. The collar 3 will thereby serve the function of a stop and spacing medium, so that the head of the nail will be exposed in order to admit of its being engaged by the claws of a hammer to effect an easy and convenient withdrawal thereof. Hence, the parts may be securely united without damage thereto and may be readily disconnected at any time.

As shown in the drawing, the extent to which the nail is driven into the wood may be varied by the use of additional smaller spacing washers 6 between the flat faced washer 4 and the shoulder 5 of the collar 3, which additional washers will preferably conform in diameter to the collar, whereby the head of the nail, when the latter is fully driven in, will project to a greater extent beyond the surface, to allow the head to be more conveniently gripped when applied close to crannies or interfering objects.

As an additional advantage resulting from the use of a removable washer and the fixed collar, it may be stated that washers of different sizes may be employed to suit different conditions of service and to obviate liability of splitting or otherwise injuring fragile woods.

An essential characteristic of my invention, however, consists in the fact that the diameter of the collar 3 (and the spacing washers 6 if used) is less than the width of the claw of an ordinary hammer, and the length of said collar is greater than the thickness of said claw; hence the latter can be easily applied astride the collar and the nail removed without injury to the surface into which it has been driven.

Having thus fully described the invention, what is claimed as new is:—

A removable nail comprising a head, a shank, and a collar at their juncture integral with both, smaller than the head, larger than the shank, and having a flat shoulder around the latter, a flat-faced washer of the diameter of said head and removably but frictionally engaging the shank, and a series of spacing washers of the diameter of said collar and located on the shank between the shoulder of the collar and said flat-faced washer.

In testimony whereof I affix my signature in presence of two witnesses.

VINCENT C. DE YBARRONDO.

Witnesses:
F. E. McINTOSH,
ARTHUR E. TANDY.